United States Patent [19]  [11] 4,251,165
Forsen  [45] Feb. 17, 1981

[54] ARRANGEMENT FOR RELEASABLE FASTENING OF A PEG IN A HOLE

[75] Inventor: John E. S. Forsén, Älmhult, Sweden
[73] Assignee: Ikea Svenska AB, Sweden
[21] Appl. No.: 25,944
[22] Filed: Apr. 2, 1979

[30] Foreign Application Priority Data

Apr. 13, 1978 [SE] Sweden ................................ 7804193

[51] Int. Cl.³ ............................................. B25G 3/00
[52] U.S. Cl. .................................... 403/263; 403/362; 248/188
[58] Field of Search ............... 403/361, 362, 263, 297, 403/154; 248/188, 188.1, 188.8

[56] References Cited

U.S. PATENT DOCUMENTS

| 3,441,253 | 4/1969 | Blum et al. | 403/297 X |
| 3,469,823 | 9/1969 | Blum et al. | 403/297 X |

FOREIGN PATENT DOCUMENTS

| 800789 | 12/1950 | Fed. Rep. of Germany | 403/297 |
| 802739 | 6/1936 | France | 248/188 |
| 811261 | 1/1937 | France | 403/362 |
| 836167 | 6/1960 | United Kingdom . | |

Primary Examiner—Andrew V. Kundrat
Attorney, Agent, or Firm—Ostrolenk, Faber, Gerb & Soffen

[57] ABSTRACT

An arrangement for releasably fastening a peg in a peg hole, e.g. a chair leg in a drill hole of a chair seat, the peg or the area around the peg hole consisting of wood or other yieldable material. When inserting the peg in the peg hole, one opening of a screw hole made through the peg is mainly located outside the peg hole, the screw hole being directed so that its other opening is mainly located within the peg hole. A screw socket, screwed into the screw hole, has its exterior threads engaging the material of the peg. A pressure plate, mounted over the second opening of the screw hole and adjacent portions of the peg hole, distributes the pressure of a screw, screwed into the screw socket. By means of friction, caused by the tension of the tightened screw, the peg is fixed in the peg hole.

8 Claims, 8 Drawing Figures

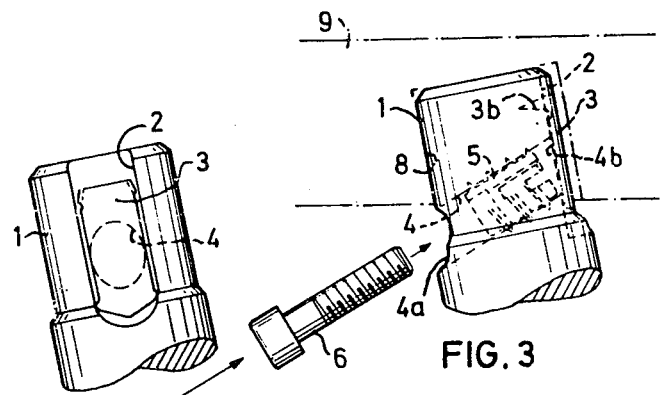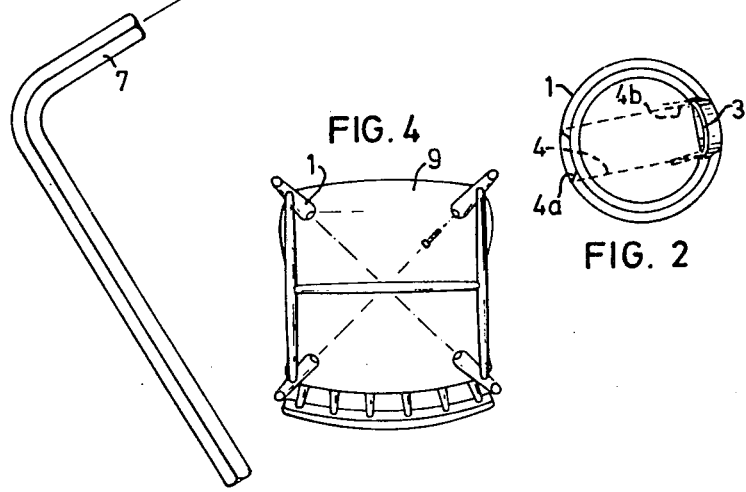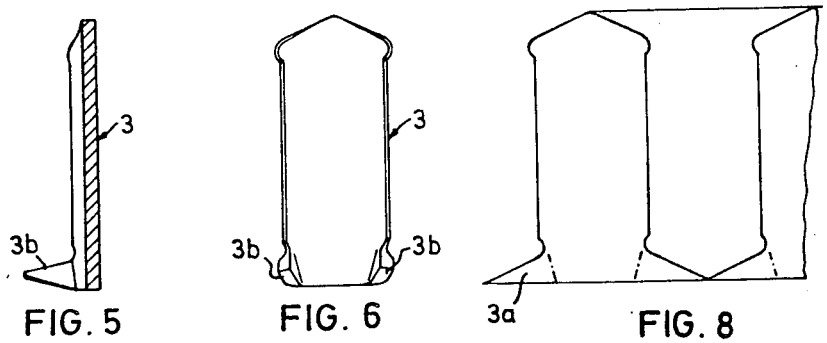

ARRANGEMENT FOR RELEASABLE FASTENING OF A PEG IN A HOLE

The invention relates to an arrangement for releasable fastening of a peg in a hole, especially a furniture leg in a drill hole which may not be perpendicular to the underside of the piece of furniture.

The problem of fixing a peg in a drill hole to form a sturdy and lasting joint is very old and over the years many different solutions have appeared since a conical peg was first glued into a corresponding hole.

The problem presented to today's furniture industry stems from the desirability of manufacturing, storing and selling furniture as components in compact packages, which the buyer/user, without special experience and with simple tools, can then assemble into furniture such as chairs, tables etc. with reliable joints.

A special problem in this area is the fastening of chair legs, for example, which are not perpendicular to the seat of the chair. The same problem arises as regards sofas, tables and other furniture.

The problem is solved according to the invention by means of an arrangement according to the characterizing clause of the main claim.

The invention is described in the following with reference to an embodiment of the invention for fastening a chair leg into a chair seat as shown in the accompanying drawings, in which FIG. 1 shows a side view of an end peg on a chair leg, FIG. 2 shows an end view of the peg in FIG. 1, FIG. 3 shows a side view of the peg in FIG. 1 rotated ¼ turn, with the arrangement according to the invention indicated by the dashed line, and inserted in a non-perpendicular hole in a chair seat, FIG. 4 shows a chair from below with the chair legs arranged for fastening according to the invention, FIGS. 5, 6 and 7 show in different views a pressure plate according to the invention, and FIG. 8 shows a series of blanks for the pressure plate in FIGS. 5, 6 and 7 before bending.

FIGS. 1, 2 and 3 show the end peg 1 of the chair leg. The peg and the seat can suitably, but not necessarily, be made of wood material. With minimal play for the peg 1, a hole 8 is drilled in the chair seat 9. The axis of the hole 8 is inclined somewhat from the normal to the underside of the chair seat.

A screw hole 4 is drilled through the peg 1. The axis of the hole 4 intersects the axis of the peg 1 at such an angle that when the peg is inserted into the hole, the entrance opening 4a is mostly located outside the underside of the chair seat 9 while the exit opening 4b is mostly located in the peg hole 8, i.e. so that the screw hole 4 exits against the cylindrical wall of the peg hole 8. Hole 4 has such a diameter that a so-called screw socket, with both exterior and interior threads, for a screw 6 can be screwed into the hole, whereby the exterior screw thread of the screw socket produces an interior thread in the material around the hole 4. Thus the screw socket 5 screwed into the hole 4 can withstand an appreciable axial load.

At the exit opening 4b of the hole 4 material is removed to provide room for a pressure plate. The resulting space can be, for example, shallow and cylindrical with somewhat larger diameter than the major axis of the exit opening 4b and designed to take a curved pressure plate. Preferably, however, the milled-out part is a groove 2 parallel to the axis, which extends from the end of the peg 1 somewhat past the exit opening 4b and whose width somewhat exceeds the diameter of the hole 4.

A pressure plate 3 is mounted in the groove 2. The function of the pressure plate is to distribute the force from the screw which is screwed into the screw socket 5 and tightened, over a sufficiently large portion of the surface of the peg hole 8 to prevent having the screw end penetrate and damage the material around the peg hole 8. This is especially important since the screw 6 is directed non-perpendicularly against the wall of the peg hole and thus strikes the wall with a very small edge surface, as can be seen from FIG. 3.

The pressure plate can have varying surface shapes and dimensions, but it should be made of relatively stiff material such as plate steel, and have a cylindrical curvature whose radius of curvature approximately agrees with the radius of the peg 1 or hole 8.

A suitable embodiment of the pressure plate 3 is shown in FIGS. 5–8. FIG. 8 shows how pressure plate blanks can be stamped out of a steel band in a single operation without any wasted materials. Sharp tips 3a extend along the edges of the steel band, in a staggered pattern along the two edges of the band. In order that the tips 3a, after bending (the pressure plate 3 being curved at the same time) and after normal spring back, shall be directed parallel to one another, the bending line forms about a 15° angle to the line of symmetry and the longitudinal edges of the pressure plate. The tips 3a now form sharp points 3b, by means of which the pressure plate 3 can be easily fixed in the material of the peg near the walls of the groove.

The arrangement according to the invention works as follows:

The chair leg with the peg 1, in whose hole 4 the screw socket 5 is screwed and in whose groove 2 the pressure plate 3 is fixed, is inserted in the hole 8 in the chair seat 9 so that the entrance opening 4a is outside the underside of the chair seat and permits screwing in of the screw 6, suitably a hex recess screw which can be tightened with a simple tool 7. The screw 6 is tightened until it presses against the pressure plate 3 with sufficient pressure. The pressure plate 3 distributes the screw force against the wall of the peg hole 8. The fastening between the chair leg and the chair seat fulfills the demands of the furniture industry as to strength over a very large number of load changes. It is also quite easily released and thus permits simple adjustment of the leg length if one leg is shorter than the others.

What I claim is:

1. A fastening device for releasably inserting and fastening an end peg of one furniture member into a peg receiving opening of another furniture member, as, for example, interconnecting and engaging a chair leg and a chair seat; said peg and said other furniture member being of material having the characteristics of wood with respect to deformability;

a screw bore extending through said peg at an oblique angle to the axis of said peg;

said screw bore having a first and a second end;

an externally threaded nut for a screw; said externally threaded nut being screwed into said screw bore; the externally threaded surface of said nut engaging the material of said peg defining said screw bore;

a screw;

said externally threaded nut also having internal threading to receive said screw;

said screw being insertable into said nut from said first end of said screw bore and being movable on rotation thereof toward said second end of said screw bore;

and a pressure plate at said second end of said screw bore substantially parallel to said peg and adapted to bear against the wall of said peg receiving opening when said peg is inserted into said peg receiving opening and to distribute the pressure from said screw when said screw is rotated against said pressure plate to fasten said peg in said peg receiving opening.

2. The fastening device of claim 1, wherein said screw bore, at its first end is accessible for insertion of said screw for rotation of said screw when said peg is inserted in said peg receiving opening.

3. The fastening device of claim 2, wherein the said second end of said screw bore extends to that portion of said peg which is inserted in and surrounded by said peg receiving opening.

4. The fastening device of claim 3, wherein the outer surface of said peg is recessed in the area of said second end of said screw bore to receive said pressure plate substantially within the outer surface of said peg.

5. The fastening device of claim 4, wherein said peg is substantially cylindrical and said peg receiving opening is correspondingly cylindrical; said pressure plate having a radius of curvature substantially like that of said peg.

6. The fastening device of claims 1, 2, 3, 4 or 5, wherein means are provided to secure said pressure plate to said outer surface of said peg.

7. The fastening device of claim 6, wherein said securing means comprises a pointed element extending from said pressure plate into said peg.

8. The fastening device of claim 7, wherein said pressure plates is stamped and bent from a metal band, said pointed element being bent from an edge of said band.

* * * * *